(12) United States Patent
Ha et al.

(10) Patent No.: US 9,487,681 B2
(45) Date of Patent: Nov. 8, 2016

(54) PRESSURE-SENSITIVE ADHESIVE COMPOSITIONS, POLARIZERS AND LIQUID CRYSTAL DISPLAYS COMPRISING THE SAME

(75) Inventors: Jeong Min Ha, Daejeon (KR); No-Ma Kim, Daejeon (KR); In Ho Hwang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 7 days.

(21) Appl. No.: 12/810,292

(22) PCT Filed: Jan. 5, 2009

(86) PCT No.: PCT/KR2009/000030
§ 371 (c)(1),
(2), (4) Date: May 3, 2011

(87) PCT Pub. No.: WO2009/088191
PCT Pub. Date: Jul. 16, 2009

(65) Prior Publication Data
US 2011/0205469 A1    Aug. 25, 2011

(30) Foreign Application Priority Data

Jan. 11, 2008 (KR) .................. 10-2008-0003609
Jul. 29, 2008 (KR) .................. 10-2008-0073986

(51) Int. Cl.
| | | |
|---|---|---|
| G02F 1/1335 | (2006.01) | |
| C09J 133/08 | (2006.01) | |
| G02B 5/30 | (2006.01) | |
| C09J 133/10 | (2006.01) | |

(52) U.S. Cl.
CPC ............ C09J 133/08 (2013.01); G02B 5/3033 (2013.01); *B32B 2457/202* (2013.01); *C09J 133/10* (2013.01); *C09J 2201/606* (2013.01); *G02F 1/133528* (2013.01); *G02F 2202/28* (2013.01); *Y10T 428/105* (2015.01); *Y10T 428/1036* (2015.01); *Y10T 428/1041* (2015.01); *Y10T 428/1059* (2015.01); *Y10T 428/1077* (2015.01); *Y10T 428/1082* (2015.01)

(58) Field of Classification Search
CPC ...... C09J 2433/00; C09J 7/00; C09J 133/00; C09J 133/08; C09J 133/10; C09J 133/12; C09J 2201/00; C09J 2201/02; C09J 2203/326; C09J 2201/606; G02F 1/133345; G02F 2001/1533; G02F 2001/1536; G02F 2202/28; G02F 1/133528; B32B 17/10743; B32B 27/00; B32B 27/04; B32B 27/06; B32B 27/08; B32B 27/16; B32B 7/12; B32B 2457/202; Y10T 428/1082; Y10T 428/1077; Y10T 428/1059; Y10T 428/1041; Y10T 428/105; Y10T 428/1036; G02B 5/3033

USPC .......... 156/106, 247; 427/208, 208.4, 208.6, 427/208.8, 207.1; 428/1.1, 413, 1.3, 1.5, 428/355 R, 355 EN, 355 BL, 355 AC, 356; 524/556, 236, 356, 555; 349/96–138; 525/329.9, 330.5; 526/931
See application file for complete search history.

(56) References Cited

U.S. PATENT DOCUMENTS

| | | | |
|---|---|---|---|
| 5,741,542 A * | 4/1998 | Williams et al. .......... | 427/208.4 |
| 6,261,685 B1 * | 7/2001 | Hosokawa et al. ........... | 428/345 |
| 7,119,160 B2 | 10/2006 | Kodama et al. | |
| 2003/0054166 A1 | 3/2003 | Chang et al. | |
| 2004/0127594 A1 * | 7/2004 | Yang et al. ................... | 522/114 |
| 2005/0191507 A1 | 9/2005 | Yang et al. | |
| 2005/0217789 A1 * | 10/2005 | Eckstein et al. .......... | 156/244.11 |
| 2005/0244633 A1 * | 11/2005 | Kobayashi et al. ...... | 428/355 R |
| 2006/0162857 A1 * | 7/2006 | Nagamoto et al. ........ | 156/272.8 |
| 2006/0204749 A1 | 9/2006 | Kita et al. | |
| 2007/0055006 A1 * | 3/2007 | Kim et al. .................... | 524/556 |
| 2007/0092733 A1 * | 4/2007 | Yang et al. ................... | 428/413 |
| 2009/0122236 A1 * | 5/2009 | Shutou ................ | G02F 1/13363 349/96 |
| 2011/0109848 A1 * | 5/2011 | Yoon et al. ..................... | 349/96 |
| 2011/0234948 A1 * | 9/2011 | Yoon et al. ..................... | 349/96 |

FOREIGN PATENT DOCUMENTS

| | | | | |
|---|---|---|---|---|
| JP | 09-512054 A | 12/1997 | | |
| JP | 2002047468 A * | 2/2002 | ............ | C09J 133/06 |
| JP | 2003049141 A * | 2/2003 | ............ | C09J 133/06 |
| JP | 3592717 | 9/2004 | | |
| JP | 3592717 B2 | 11/2004 | | |
| JP | 2005-314579 | 11/2005 | | |
| JP | 2006-235568 | 9/2006 | | |
| JP | WO 2007046276 A1 * | 4/2007 | ......... | G02F 1/13363 |
| JP | 2007-161908 A | 6/2007 | | |
| JP | 2007-161909 A | 6/2007 | | |

(Continued)

*Primary Examiner* — Gwendolyn Blackwell
*Assistant Examiner* — Eli D Strah
(74) *Attorney, Agent, or Firm* — Dentons US LLP

(57) ABSTRACT

The present invention relates to a pressure-sensitive adhesive composition including interpenetrating polymer networks in a cured state, wherein the composition comprise a multi-functional acrylate and a thermal initiator; a polarizer; and a liquid crystal display comprising the same. In the present invention, the pressure-sensitive adhesive composition may be provided, which can outstandingly prevent light leakage phenomenon, with having excellent physical properties such as endurance reliability under high temperature and/or high humidity conditions and workability. Especially, according to the present invention, the pressure-sensitive adhesive composition, polarizer and liquid crystal display are provided, which can outstandingly prevent light leakage phenomenon even in large-sized display devices.

18 Claims, 1 Drawing Sheet

(56) References Cited

FOREIGN PATENT DOCUMENTS

| | | |
|---|---|---|
| JP | 2007-197659 | 8/2007 |
| JP | 2007-212995 | 8/2007 |
| JP | 2009-132909 | 6/2009 |
| JP | 2009-144145 | 7/2009 |
| JP | 2009-173875 | 8/2009 |
| KR | 10-2002-0060272 A | 7/2002 |
| KR | 10-2007-0094066 A | 9/2007 |
| WO | 95/29770 | 11/1995 |
| WO | WO 2007/068625 A1 | 6/2007 |

* cited by examiner

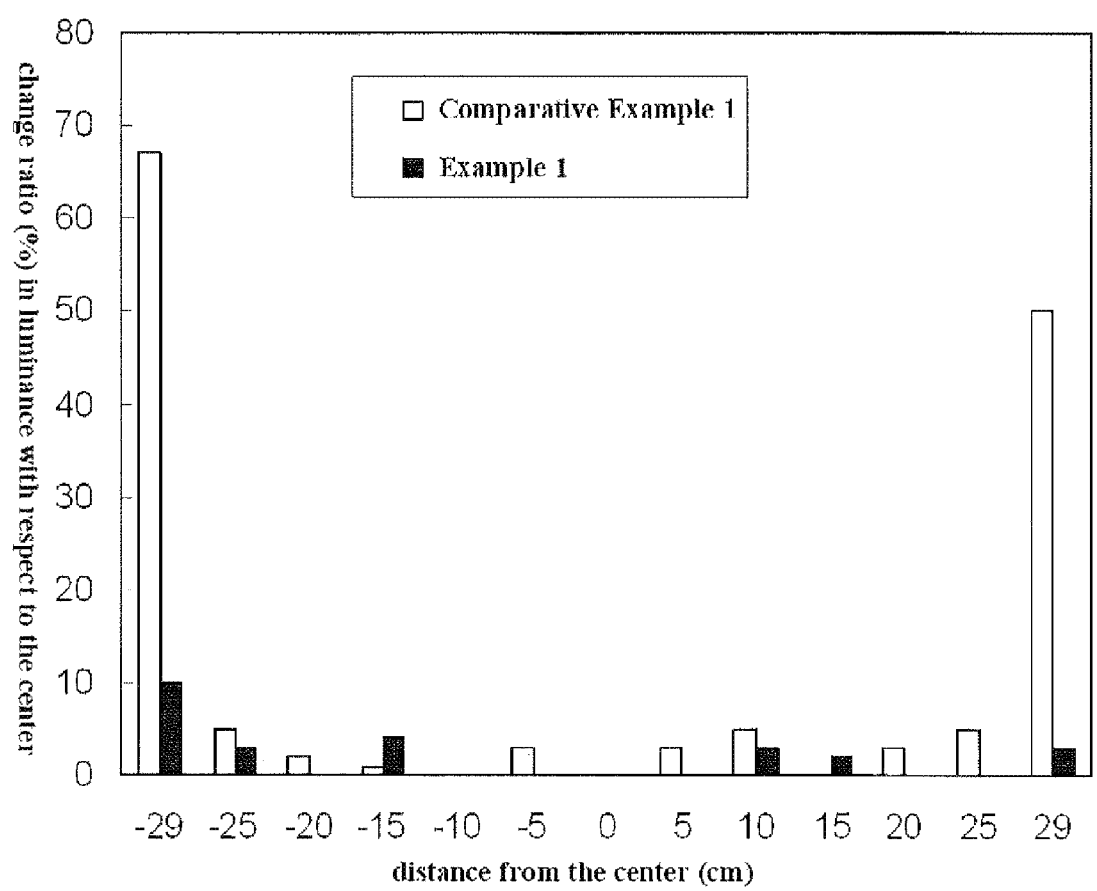

PRESSURE-SENSITIVE ADHESIVE COMPOSITIONS, POLARIZERS AND LIQUID CRYSTAL DISPLAYS COMPRISING THE SAME

This application is a National Stage Entry of International Application No. PCT/KR2009/000030, filed Jan. 5, 2009, and claims the benefit of Korean Application Nos. 10-2008-0003609, filed on Jan. 11, 2008 and 10-2008-0073986, filed on Jul. 29, 2008, which are hereby incorporated by reference for all purposes as if fully set forth herein.

TECHNICAL FIELD

The present invention relates to a pressure-sensitive adhesive composition having excellent physical properties under high temperature and/or high humidity conditions, and light leakage-preventing property; a polarizer; and a liquid crystal display comprising the same.

BACKGROUND ART

The liquid crystal display is a device representing images by liquid crystals inserted between two sheets of thin glass substrates. In said device, when voltages are applied through electrodes connected to liquid crystals, the molecular alignment manner of liquid crystals changes, whereby transmission ratio of lights passing through the liquid crystals is changed, so that pictures or colors may be represented. Such a liquid crystal display has advantages that it uses very little power and can be flatly and thinly made. Therefore, it is a display device being in the limelight of various fields at present.

For preparing the liquid crystal display, liquid crystal cells comprising liquid crystals and glass substrates having transparent electrode, and polarizers are basically required and suitable adhesives or pressure-sensitive adhesives are also required for binding them.

The polarizer comprises an iodine compound or a dichroic polarizing material aligned in a certain direction, and has multi-layer structure comprising TAC (triacetyl cellulose) protective films for protecting polarizing elements, and the like. In addition, the polarizer may additionally comprise a phase difference film, a compensation film for wide view angle or a brightness enhancement film, and the like. Each film constituting these multi-layer polarizers is made of materials having different molecular structures and compositions, and so has different physical properties. Thus, under high temperature and/or high humidity conditions, it has inferior dimensional stability, since shrinkage or expansion behavior of the materials having a unidirectional molecular alignment is different. Therefore, if the polarizer is fixed by a pressure-sensitive adhesive, stress is concentrated on the TAC layer by shrinkage or expansion under high temperature and/or high humidity conditions, thereby birefringence and light leakage phenomenon occur.

As a representative method for solving said problems, there is a method for giving stress relief property thereto by designing the pressure-sensitive adhesive to have high creep against external stress and to be easily modified. Specifically, it is a method for mixing high molecular weight polymer containing a functional group which may react with a cross-linking agent, with low molecular weight material including less or no cross-linkable functional group (KR Laid-open Patent Publication No. 1998-79266, and JP Laid-open Patent Publication Nos. 2002-47468 and 2003-49141).

However, the pressure-sensitive adhesive composition disclosed in said techniques has very poor tailoring property. Thus, on preparing polarizers, crooking or pressing phenomenon is arisen in the pressure-sensitive adhesive. So, there is a problem that yield is highly lowered.

As other technique for preventing light leakage phenomenon, there is a method for designing the pressure-sensitive adhesive to be very hard. When the pressure-sensitive adhesive has hard property, shrinking or expansion of the polarizer under high temperature and/or high humidity conditions is suppressed, whereby the resulting stress is minimized and focused on the outermost, so that relatively good optical properties may be realized.

However, in order to design the pressure-sensitive adhesive to be hard, bulk modulus of the adhesive should be much increased, and thereby endurance reliability is deteriorated, since adhesive property becomes lowered according to the increasing of the modulus.

Also, there are proposed methods, in which a photoinitiator and a multi-functional acrylate are added to a conventional single crosslinking structure, so as to improve bulk modulus, since the conventional single crosslinking structure cannot realize enough bulk modulus to maintain good light leakage-resistance property and endurance reliability (JP Laid-open Patent Publication Nos. 2007-197659 and 2007-212995).

In case of the pressure-sensitive adhesive compositions disclosed in said publications, they all employ an activating energy ray-curing system. That is, all pressure-sensitive adhesive compositions of the publication comprise photoinitiator as essential component, and the photoinitiator transforms a multi-functional acrylate into polymer, so as to form a secondary crosslinking structure by UV irradiation.

However, in case of UV curing system as above, it is impossible to get uniform pressure-sensitive adhesive layer, since UV absorbing degrees is changed according to thickness of pressure-sensitive adhesive. Therefore, in case of a polarizer to which pressure-sensitive adhesive disclosed in the publication is adhered, lots of light leakage phenomena are generated at outmost thereof especially when it is adhered to a large size display device, and kept for long time under high temperature and high humidity conditions.

DISCLOSURE

Technical Problem

The present invention is accomplished considering the problems of the prior arts as described above, and is intended to provide a pressure-sensitive adhesive composition having excellent physical properties such as endurance reliability under high temperature and/or high humidity conditions and re-movability, and representing superior light leakage-preventing property even in case of being used in large display devices with a size of 20 inches or more, a polarizer and a liquid crystal display using the same.

Technical Solution

As means to solve said object, the present invention provides a pressure-sensitive adhesive composition, including interpenetrating polymer networks in a cured state, wherein the composition comprises a multi-functional acrylate and a thermal initiator.

As another means to solve said object, the present invention provides a polarizer comprising a polarizing film or a polarizing device; and a pressure-sensitive adhesive layer which is formed on one or both sides of said polarizing film or device, and comprises a cured product of the pressure-sensitive adhesive composition according to the present invention.

As another means to solve said object, the present invention provides a liquid crystal display comprising a liquid crystal panel in which the polarizer according to the present invention is bonded to one or both sides of a liquid crystal cell.

Advantageous Effects

According to the present invention, the pressure-sensitive adhesive composition is provided, which has excellent physical properties such as endurance reliability under high temperature and/or high humidity conditions and re-movability, and representing superior light leakage-preventing property even in case of being used in large display devices with a size of 20 inches or more, a polarizer and a liquid crystal display using the same.

DESCRIPTION OF DRAWINGS

FIG. 1 is a graph showing change ratio of luminance observed at the horizontal axis of the monitor after applying the pressure-sensitive adhesive of Example 1 and Comparative Example 1 to 26 inch monitor.

BEST MODE

The present invention relates to a pressure-sensitive adhesive composition, including interpenetrating polymer networks (hereinafter, it can be referred to as "IPN") in a cured state,
wherein the composition comprises a multi-functional acrylate and a thermal initiator.
The present invention also relates to a polarizer comprising:
a polarizing film or a polarizing device; and
a pressure-sensitive adhesive layer which is formed on one or both sides of said polarizing film or device; and comprises a cured product of the pressure-sensitive adhesive composition according to the present invention.

The present invention also relates to a liquid crystal display comprising a liquid crystal panel in which the polarizer according to the present invention is bonded to one or both sides of a liquid crystal cell.

The present pressure-sensitive adhesive composition is described in more detail below.

The pressure-sensitive adhesive composition of the present invention includes IPN in a cured state, and the term "cured state" used herein refers to a state in which the pressure-sensitive adhesive composition turns into a pressure-sensitive adhesive through a heating process, and the like. Also, the term "interpenetrating polymer networks" used herein refers to a state in which the pressure-sensitive adhesive comprises a crosslinking structure (hereinafter, it can be referred to as a "secondary crosslinking structure") formed form reactions of the multi-functional acrylate and the thermal initiator together with a crosslinking structure (hereinafter, it can be referred to as a "primary crosslinking structure") formed from a base resin.

In the present invention, the kinds of the base resin forming the primary crosslinking structure are not specially limited, and any conventional base resin used in a pressure-sensitive adhesive may be freely used.

For example, the composition of the present invention may comprise an acrylic copolymer as the base resin forming the primary crosslinking structure.

In the present invention, it is preferred that the acrylic copolymer has a weight average molecular weight ($M_w$) of 1,000,000 or more. If the weight average molecular weight of said copolymer is less than 1,000,000, it is apprehended that the endurance reliability of the composition is lowered, so that bubbles or peeling phenomenon may be occurred due to lowered cohesion under high temperature and/or high humidity conditions.

As long as the weight average molecular weight of the copolymer usable in the present invention is 1,000,000 or more, the upper limit is not particularly restricted, but it is preferred that the upper limit is 2,500,000. If the weight-average molecular weight is in excess of 2,500,000, it is apprehended that the coating property is lowered due to increasing of viscosity, or endurance reliability is deteriorated due to lowering of pressure-sensitive adhesive force.

The specific composition of the copolymer used in the present invention is not particularly restricted, as long as it has the weight average molecular weight as described above. For example, the copolymer may be used herein, which comprises (meth)acrylic acid ester monomer and a monomer containing a cross-linkable functional group.

In the above, any kind of (meth)acrylic acid ester monomer may be used. For example, alkyl (meth)acrylate may be used. In that case, when the alkyl group included in said monomer has excessively long chain, it is apprehended that cohesion of the pressure-sensitive adhesive is lowered and glass transition temperature ($T_g$) and adhesiveness are not easily controlled. Therefore, it is preferred to use (meth)acrylic acid ester monomer having an alkyl group with 2 to 14 carbon atoms. An example of such a monomer may include one or more selected from the group consisting of ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate and tetradecyl (meth)acrylate. It is preferred that the (meth)acrylic acid ester monomer is comprised in an amount of 50 to 94 parts by weight, and preferably 70 to 94 parts by weight, based on 100 parts by weight of the copolymer. If said content is less than 50 parts by weight, it is apprehended that the initial adhesion strength of pressure-sensitive adhesive is lowered. If it is in excess of 94 parts by weight, it is apprehended that a problem is caused in durability due to lowered cohesion.

The monomer containing a cross-linkable functional group gives a cross-linkable functional group to the acrylic copolymer, and serves to control endurance reliability, adhesion strength and cohesion.

An example of usable monomers containing a cross-linkable functional group herein may include, but is not limited to, monomers containing a hydroxyl group, monomers containing carboxyl group, or monomers containing nitrogen. In the present invention, one or two or more of the foregoing monomers may be used. An example of usable monomers containing a hydroxyl group herein may include, but is not limited to, one or two or more species of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate. An example of usable monomers containing a carboxyl group herein may include, but is not limited to, one or two or more species of (meth)acrylic acid, 2-(meth) acryloyloxy acetic acid, 3-(meth)acryloloxy propylic acid, 4-(meth)acryloyloxy butylic acid, acrylic acid dimer, itaconic acid, maleic acid and maleic anhydride. An example of usable monomers containing nitrogen herein may include, but is not limited to, one or two or more species of (meth)acrylamide, N-vinyl pyrolidone and N-vinyl caprolactam.

It is preferred that the monomer containing a cross-linkable functional group as above is contained in an amount of 0.01 to 10 parts by weight, and preferably 0.1 to 10 parts by weight, based on 100 parts by weight of the copolymer. If said content is less than 0.01 parts by weight, it is apprehended the re-movability is deteriorated. If it is in excess of 10 parts by weight, it is apprehended that adhesiveness, durability and/or peel force is lowered.

The acrylic copolymer may further comprise a monomer containing an alkylene oxide group. The monomer gives alkylene oxide to copolymer, and the alkylene oxide can reduce haze in a final product by increasing miscibility of the copolymer and the multi-function acrylate. Also, the alkylene oxide can make the pressure-sensitive adhesive have an excellent light leakage-preventing property by increasing bulk modulus when same amount of the multi-functional acrylate is used. Additionally, the alkylene oxide can improve durability, since it can make the adhesive to maintain good pressure-sensitive adhesive even in a state where the bulk modulus is much increased. Especially, the alkylene oxide shows an excellent miscibility with the acrylate having at least 3 functional groups and comprising a cyclic structure in its skeleton.

An example of usable monomer containing an alkylene oxide group include, but is not limited thereto, (meth)acrylic acid alkylene oxide adduct. An example of usable (meth) acrylic acid alkylene oxide adduct herein may include, but is not limited to, one or two or more species of alkoxy ethyleneglycol (meth)acrylic acid ester, alkoxy diethyleneglycol (meth)acrylic acid ester, alkoxy triethyleneglycol (meth)acrylic acid ester, alkoxy tetraethyleneglycol (meth) acrylic acid ester, phenoxy ethyleneglycol (meth)acrylic acid ester, phenoxy diethyleneglycol (meth)acrylic acid ester, phenoxy triethyleneglycol (meth)acrylic acid ester, phenoxy tetraethyleneglycol (meth)acrylic acid ester, alkoxy propyleneglycol (meth)acrylic acid ester, alkoxy dipropyleneglycol (meth)acrylic acid ester, alkoxy tripropyleneglycol (meth)acrylic acid ester, alkoxy tetrapropyleneglycol (meth)acrylic acid ester, phenoxy propyleneglycol (meth) acrylic acid ester, phenoxy dipropyleneglycol (meth)acrylic acid ester, phenoxy tripropyleneglycol (meth)acrylic acid ester and phenoxy tetrapropyleneglycol (meth)acrylic acid ester. In the above, the "alkoxy" may refer to an alkoxy having 1 to 8 carbon atom(s), and preferably methoxy, ethoxy, propoxy or butoxy.

The content of the (meth)acrylic acid alkylene oxide adduct is not specially limited, and it can be appropriately selected considering the above property. For example, the (meth)acrylic acid alkylene oxide adduct may be comprised in an amount of 2 to 40 parts by weight, based on 100 parts by weight of the acrylic copolymer.

Also, in the copolymer of the present invention, a monomer represented in Formula 1 below may be further copolymerized. Such a monomer may be added for controlling glass transition temperature of a pressure-sensitive adhesive and giving other functions thereto.

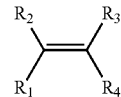

[Formula 1]

wherein $R_1$, $R_2$ and $R_3$ represents independently hydrogen or alkyl, $R_4$ represents cyano; phenyl unsubstituted or substituted with alkyl; acetyloxy; or $COR_5$, where $R_5$ represents amino unsubstituted or substituted with alkyl or alkoxyalkyl; or glycidyloxy.

In the definitions of $R_1$ to $R_5$ of the above formula, alkyl or alkoxy means alkyl or alkoxy having 1 to 8 carbon atoms, and is, preferably, methyl, ethyl, methoxy, ethoxy, propoxy or butoxy.

The specific kind of monomer represented by the above Formula 1 may include, but is not limited to, one or two or more of nitrogen-containing monomers such as (meth)acrylonitrile, (meth)acrylamide, N-methyl (meth)acrylamide or N-butoxy methyl (meth)acrylamide; styrene monomer such as styrene or methyl styrene; glycidyl (meth)acrylate; or carbonic acid vinyl ester such as vinyl acetate, and the like. When the functional monomer as above is contained in the present acrylic copolymer, the content is, preferably, 20 parts by weight or less. If said content is in excess of 20 parts by weight, it is apprehended that flexibility and/or peel force of the pressure-sensitive adhesive is lowered.

The method for preparing the copolymer is not particularly restricted. For example, it can be prepared through general methods such as solution polymerization, photopolymerization, bulk polymerization, suspension polymerization, or emulsion polymerization. Especially, it is preferred to use solution polymerization. Preferably, such solution polymerization is carried out at a polymerization temperature of 50 to 140° C. by mixing an initiator in a state that each monomer is homogeneously mixed. At this time, as a usable initiator, a usual initiator, for example, an azo-based polymerization initiator such as azo-bisisobutyronitrile or azobiscyclohexanecarbonitrile; and/or a peroxide such as benzoyl peroxide or acetyl peroxide may be included.

The present pressure-sensitive adhesive composition comprises a multi-functional acrylate together with the base resin as previously described. The multi-functional acrylate serves to form the secondary crosslinking structure through a reaction with the thermal initiator. Preferably, an acrylate having a molecular weight of less than 1,000 and containing three or more functional groups, is used. By using an acrylate containing three or more functional groups, physical properties such as endurance reliability and light leakage-preventing property may be further improved. An example of such acrylate may include, but is not limited to, a trifunctional acrylate such as trimethylolpropane tri(meth) acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane (meth)acrylate or tris(meth)acryloxy ethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; and a hexafunctional acrylate such as dipentaerythritol hexa(meth)acrylate, caprolactone-modified dipentaerythritol hexa(meth)acrylate or isocyanate-modified urethane (meth)acrylate (ex. a reactant of trimethylolpropane tri(meth)acrylate with an isocyanate monomer).

Herein, one or a mixture of two or more of multi-functional acrylates as above may be used. Especially, it is preferred to use an acrylate having cyclic structure in their skeleton. By using such an acrylate, the light leakage-preventing property can be further improved since it is possible to design the pressure-sensitive adhesive to be harder. At this time, the cyclic structure may comprise carbocyclic or heterocyclic structure; or monocyclic or polycyclic structure. An example of acrylate comprising the cyclic structure may include a monomer having isocyanurate structure such as tris(meth)acryloxy ethyl isocyanurate; and hexafunctional acrylate such as isocyanate-modified urethane (meth)acrylate (ex. a reactant of trimethylolpropane tri(meth)acrylate with an isocyanate monomer).

In the pressure-sensitive adhesive composition, the multi-functional acrylate as above is, preferably, contained in an amount of 5 to 40 parts by weight, relative to 100 parts by weight of the base resin. If the content is less than 5 parts by weight, it is apprehended that light leakage-preventing property and/or durability under high temperature is deteriorated. If the content is in excess of 40 parts by weight, it is apprehended that durability under high temperature is deteriorated.

The present pressure-sensitive adhesive composition comprises a thermal initiator forming the secondary cross-linking structure by reacting with the multi-functional acrylate. Although it is not particularly limited, it is preferable that a thermal initiator having a 10 hours half-life decomposition temperature of 40° C. to 80° C. is used. If the temperature is less than 40° C., it is apprehended that it is difficult to use due to a excessive lowering of pot-life of a coating liquid. If the temperature is in excess of 80° C., shrinking problem of a base film is occurred, since high temperature is needed to accelerate heat-decomposition of the initiator during coating process.

Specific kind of the thermal initiator which may be used herein is not particularly restricted, and may include, for example, one or more selected from the group consisting of azo compound such as 2,2-azobis-2,4-dimethylvaleronitrile (V-65, manufactured by Wako), 2,2-azobisisobutyronitrile (V-60, manufactured by Wako) or 2,2-azobis-2-methylbutyronitrile (V-59, manufactured by Wako); peroxy ester compounds such as dipropyl peroxydicarbonate (Peroyl NPP, manufactured by NOF), diisopropyl peroxy dicarbonate (Peroyl IPP, manufactured by NOF), bis-4-butylcyclohexyl peroxydicarbonate (Peroyl TCP, manufactured by NOF), diethoxy ethyl peroxy dicarbonate (Peroyl EEP, manufactured by NOF), diethoxyhexyl peroxy dicarbonate (Peroyl OPP, manufactured by NOF), hexyl peroxy dicarbonate (Perhexyl ND, manufactured by NOF), dimethoxybutyl peroxy dicarbonate (Peroyl MBP, manufactured by NOF), bis(3-methoxy-3-methoxybutyl)peroxy dicarbonate (Peroyl SOP, manufactured by NOF), hexylperoxy pivalate (Perhexyl PV, manufactured by NOF), amyl peroxy pivalate (Luperox 546M75, manufactured by Atofina), butyl peroxy pivalate (Perbutyl, manufactured by NOF) or trimethylhexanoyl peroxide (Peroyl 355, manufactured by NOF); peroxy dicarbonate compound such as dimethyl hydroxybutyl peroxyneodecanoate (Luperox 610M75, manufactured by Atofina), amyl peroxy neodecanoate (Luperox 546M76, manufactured by Atofina) or butyl peroxy neodecanoate (Luperox 10M75, manufactured by Atofina); and acyl peroxide such as 3,5,5-trimethylhexanoyl peroxide, lauryl peroxide or dibenzoyl peroxide. In the present invention, one or two or more of the forgoing may be used alone or in a mixture thereof.

In general, if a thermal initiator is heated, then radical is generated. According to reactivity of the generated radical, hydrogen abstraction of the base resin (ex. acrylic copolymer) and addition chain reaction of the multi-functional acrylate are induced respectively or simultaneously. However, it is preferable that the hydrogen abstraction is suppressed from the viewpoint of controlling pressure-sensitive adhesive property and durability. Therefore, it is preferable to use azo compound or acyl peroxide, and it is more preferable to use acyl peroxide.

The thermal initiator as above may be contained in an amount of 0.1 to 10 parts by weight, preferably 0.5 to 5 parts by weight, and more preferably 1 to 5 parts by weight, relative to 100 parts by weight of the base resin. If the content is less than 0.1 parts by weight, it is apprehended that efficiency to initiate reaction or reproducibility is deteriorated. If the content is in excess of 10 parts by weight, it is apprehended that durability is deteriorated due to remaining initiators.

The present pressure-sensitive adhesive composition may further comprise a multi-functional cross-linking agent, which may react with the base resin, and control the pressure-sensitive adhesive property and cohesion.

Specific kind of the cross-linking agent which may be used herein is not particularly restricted, and may include, for example, an isocyanate compound, an epoxy compound, an aziridine compound and a metal chelate compound.

An example of the isocyanate compound includes tolylene diisocyanate, xylene diisocyanate, diphenylmethane diisocyanate, hexamethylene diisocyanate, isophorone diisocyanate, tetramethylxylene diisocyanate, naphthalene diisocyanate and a reaction product of any one of the foregoing with polyol (ex. trimethylol propane); an example of the epoxy compound includes ethyleneglycol diglycidylether, triglycidylether, trimethylolpropane triglycidylether, N,N,N',N'-tetraglycidyl ethylenediamine and glycerin diglycidylether; an example of the aziridine compound include N,N'-toluene-2,4-bis (1-aziridinecarboxamide), N,N'-diphenylmethane-4,4'-bis(1-aziridinecarboxamide), triethylene melamine, bisisophthaloyl-1-(2-methylaziridine) and tri-1-aziridinylphosphine oxide. Also, an example of the metal chelate compound includes compound in which multivalent metal such as aluminum, iron, zinc, tin, titan, antimony, magnesium and/or vanadium is being chelated to acetyl acetone or ethyl acetoacetate. In the present invention, one or two or more of the forgoing may be used alone or in a mixture thereof.

The cross-linking agent may be contained in an amount of 0.1 to 3 parts by weight, relative to 100 parts by weight of the base resin. If said content is less than 0.1 parts by weight, it is apprehended that the cohesion of the pressure-sensitive adhesive is lowered, since the cross-linking reaction is not well performed. If it is in excess of 3 parts by weight, it is apprehended that the endurance reliability is lowered by causing interlayer peeling or loosing phenomenon, since the cross-linking reaction is excessively proceeded.

The present pressure-sensitive adhesive composition may also comprise a silane coupling agent in addition to the components as described above. Such a coupling agent improves adhesion and bonding stability between the pressure-sensitive adhesive and a glass substrate, whereby heat resistance and humidity resistance can be further improved. Also, when the pressure-sensitive adhesive is left under high temperature and/or high humidity for a long time, the coupling agent serves to improve attachment reliability. An example of usable coupling agent herein may include, but is not limited thereto, γ-glycidoxypropyltrimethoxy silane, γ-glycidoxypropylmethyldiethoxy silane, γ-glycidoxypropyltriethoxy silane, 3-mercaptopropyl trimethoxy silane, vinyltrimethoxy silane, vinyl triethoxy silane, γ-methacryloxypropyl trimethoxy silane, γ-methacryloxypropyl triethoxy silane, γ-aminopropyl trimethoxy silane, γ-aminopropyl triethoxy silane, 3-isocyanatopropyl triethoxy silane or γ-acetoacetate propyl trimethoxy silane. One or two or more of the forgoing may be used alone or in a mixture thereof. Preferably, such a silane coupling agent is contained in an amount of 0.01 to 5 parts by weight in the composition, relative to 100 parts by weight of the base resin. If said content is less than 0.01 parts by weight, it is apprehended that the effect of increasing adhesion strength is slight. If it is in excess of 5 parts by weight, it is apprehended that the endurance reliability is lowered, so that bubbles or peeling phenomenon may be caused.

Also, from the viewpoint of controlling adhesion performance, the present pressure-sensitive adhesive composition may further comprise 1 to 100 parts by weight of a tackifier resin, relative to 100 parts by weight of the base resin. Specific kind of such a tackifier resin is not particularly restricted, and may use one or two or more mixtures of a (hydrogenated) hydrocarbon resin, a (hydrogenated) rosin resin, a (hydrogenated) rosin ester resin, a (hydrogenated) terpene resin, a (hydrogenated) terpene phenol resin, a polymerized rosin resin, or a polymerized rosin ester resin, and the like. If the content of said tackifier resin is less than 1 part by weight, it is apprehended that the effect caused by adding it is slight. If it is in excess of 100 parts by weight, it is apprehended that the effect of improving compatibility and/or cohesion is lowered.

Also, the present pressure-sensitive adhesive composition may further comprise one or more additives selected from the group consisting of an epoxy resin, a hardener, a UV stabilizer, an antioxidant, a colorant, a reinforcing agent, a filling agent, a defoaming agent, a surfactant and a plasticizer in a range of not affecting the effect of the present invention.

In addition, the present invention relates to a polarizer, comprising:
    a polarizing film or a polarizing device; and
    a pressure-sensitive adhesive layer which is formed on one or both sides of said polarizing film or device, and comprises a cured product of the pressure-sensitive adhesive composition, according to the present invention, as described above.

Specific kind of a polarizing film or polarizing device constituting said polarizer of the present invention is not particularly restricted. For example, a film obtained by containing a polarizing component such as iodine or dichroic dye into polyvinyl alcohol resin film, and elongating the resulting product may be used as said polarizing film. Said polyvinyl alcohol resin may comprise polyvinyl alcohol, polyvinyl formal, polyvinyl acetal and hydrolysate of ethylene-vinyl acetate copolymer, and the like. The thickness of said polarizing film is also not particularly restricted. It may be formed in a usual thickness.

The polarizer may be formed as a multilayer film, wherein protective films, such as a cellulose film, for example, triacetyl cellulose; a polyester film, for example a polycarbonate film or a polyethylene terephthalate; a polyether sulphone film; and/or a polyolefin film, for example, polyethylene film, polypropylene film, polyolefin film having cyclo or norbornene structure, or ethylene-propylene copolymer, are laminated on one or both sides of the polarizing film. At this time, the thickness of these protective films is also not particularly restricted. It may be formed in a usual thickness.

In addition, the present polarizer may further comprise one or more functional layers selected from the group consisting of protective layer, reflecting layer, anti-glare layer, phase difference plate, compensation film for wide view angle, and brightness enhancing film. At this time, specific kind of material, preparation method, thickness of the functional layers is not particularly limited, and conventional ones can be applied.

The method of forming the pressure-sensitive adhesive layer on the polarizing film or device as above is not particularly restricted, and may be used, for example, as a method of coating and hardening the pressure-sensitive adhesive composition on said polarizing film with Bar Coater and the like, or a method of coating and drying the pressure-sensitive adhesive on the surface of releasable substrate and then, transferring the pressure-sensitive adhesive layer to the surface of polarizing film.

It is preferred from the viewpoint of carrying out homogeneous coating that the crosslinking agent is controlled for cross-linking reaction of functional groups to be not performed on forming pressure-sensitive adhesive layer. That is, said crosslinking agent forms a cross-linking structure in drying and aging steps after coating to improve cohesion, whereby it may improve physical properties of pressure-sensitive adhesive articles such as adhesive property and cuttability.

In addition, on forming said pressure-sensitive adhesive layer, it is preferred to use the composition after sufficiently removing components causing bubbles such as volatile ingredients or reaction residues within the composition. If the cross-linking density or molecular weight is excessively low and thus elasticity modulus is lowered, it is apprehended that scatterers are formed inside by magnifying small bubbles present between the glass plate and the pressure-sensitive adhesive layer at high temperature conditions.

On preparing pressure-sensitive adheshive polarizers, the method of hardening the pressure-sensitive adhesive composition of the present invention is not particularly limited. For example, it is carried out by applying heat enough to activate the thermal initiator contained in the composition.

In the present pressure-sensitive adhesive layer, the gel content as represented in General Formula 1 below is preferably 80% to 99% and more preferably 90% to 99%.

$$\text{Gel Content } (\%) = B/A \times 100 \qquad \text{[General Formula 1]}$$

wherein A represents weight of the pressure-sensitive adhesive, and B represents dry weight of insoluble content after depositing the adhesive in ethyl acetate at ambient temperature for 48 hours.

If said gel content is less than 80%, it is apprehended that the endurance reliability under high temperature and/or high humidity conditions is lowered. If it is in excess of 99%, it is apprehended that the stress relief property of pressure-sensitive adhesive is lowered.

In addition, the present invention relates to a liquid crystal display comprising a liquid crystal panel, in which the polarizer according to the present invention is bonded to one or both sides of a liquid crystal cell.

Specific kind of liquid crystal cell, constituting the liquid crystal display of the present invention as above, is not particularly restricted, and includes all general liquid crystal cells such as TN (Twisted Neumatic), STN (Super Twisted Neumatic), IPS (In Plane Switching) or VA (Vertical Alignment). Specific kind of other construction included in the liquid crystal display of the present invention and process for preparing the same is not particularly restricted, and general constructions in this field may be selected and used without limitation.

MODE FOR INVENTION

The present invention is explained in more detail through examples according to the present invention and comparative examples not according to the present invention below, but the scope of the present invention is not restricted to examples as described below.

Example 1

Preparation of Acrylic Copolymer

To 1 L reactor, which nitrogen gas was refluxed in and equipped with a cooling system for easy temperature control, was added a mixture of monomers consisting of 99 parts by weight of n-butyl acrylate (n-BA) and 1.0 part by weight of hydroxyl ethylacrylate (HEA). Then, 120 parts by weight of ethyl acetate (EAc) was added thereto as a solvent. To remove oxygen, nitrogen gas was purged for 60 minutes. Then, the temperature was kept at 60° C. and 0.03 parts by weight of azobisisobutyronitrile (AIBN) as a initiator was added thereto and reacted for 8 hours. After the reaction, the resulting product was diluted with ethyl acetate (EAc) to prepare an acrylic copolymer having a solid content of 15% by weight, a weight average molecular weight of 1,600,000, and a molecular weight distribution of 4.9.

Preparation of Pressure-Sensitive Adhesive Composition

Relative to 100 parts by weight of the acrylic copolymer as prepared above, 15 parts by weight of hexafunctional acrylate (isocyanate-modified urethane acrylate; a reaction product of isocyanate and pentaerythritol triacrylate), 1.0 parts by weight of XDI isocyanate hardener (D110N, manufactured by Mitsui Takeda, (JP)), 2.5 parts by weight of lauryl peroxide (10 hours half-life temperature: 64° C.) as a thermal initiator and 0.2 parts by weight of silane coupling agent containing a β-cyanoacetyl group (manufactured by LG Chemical Ltd.) were mixed and a concentration of solid content in the resulting coating liquid was controlled to 15%, to prepare a pressure-sensitive adhesive composition.

Preparation of Pressure-Sensitive Adhesive Polarizer

The pressure-sensitive adhesive composition as prepared above was coated on a polyethyleneterephthalate (PET) (MRF-38, manufactured by Mitsubishi Corporation) film that has been subjected to release treatment, and has a thickness of 38 micron to have a thickness of 25 micron after dryness, and said film was dried in an oven at 135° C. for 5 minutes. Then, the dried pressure-sensitive adhesive layer was stored at Temperature and Humidity Room Chamber (23° C., 55% RH) for about one day, and laminated on the WV coating layer of the polarizer that a WV (Wide View) liquid crystal layer was coated on one side.

Examples 2 to 8 and Comparative Examples 1 and 2

Preparation of Pressure-Sensitive Adhesive Composition

Pressure-sensitive adhesive compositions were prepared by the same method as Example 1, except that components as shown in Table 1 below were mixed with the acrylic copolymers as prepared above.

TABLE 1

|  | Example | | | | Comparative Example | |
|---|---|---|---|---|---|---|
|  | 1 | 2 | 3 | 4 | 1 | 2 |
| Acrylic copolymer | 100 | 100 | 100 | 100 | 100 | 100 |
| Multi-function A | 15 | 15 | 15 | — | — | 15 |
| Multi-function B | — | — | — | 20 | 20 | — |
| Hardner | 1.0 | 1.0 | 1.0 | 1.0 | 1.0 | 1.0 |
| LPO | 2.5 | — | — | — | — | — |
| BPO | — | 2.5 | — | — | — | — |
| THP | — | — | 2.5 | 2.5 | — | — |
| Irg500 | — | — | — | — | 1.0 | 1.0 |
| M812 | 0.2 | 0.2 | 0.2 | 0.2 | 0.2 | 0.2 |

Multi-function A: hexafunctional acrylate
Multi-function B: trifunctional acrylate(tris(meth)acryloxy ethyl isocyanurate)
Hardner: XDI isocyanate(D110N)
LPO: lauryl peroxide (10 hours half life temperature: 64° C.)
BPO: dibenzoyl peroxide (10 hours half life temperature: 73° C.)
THP: trimethyl hexanoyl peroxide (10 hours half life temperature: 59° C.)
Irg500: photoinitiator (mixture(1:1) of benzophenone and hydroxy cyclohexylphenyl ketone)(Ciba Specialty Chemicals (Swiss))
M812: silane coupling agent containing β-cyanoacetyl group (LG Chemical Ltd.)

Using the polarizers prepared in Examples and Comparative Examples, gel fraction, adhesion strength, re-movability, endurance reliability, uniformity of light transmission (light leakage), haze and modulus were measured by methods as shown below.

1. Measurement of Gel Fraction

The prepared pressure-sensitive adhesive layer was left in a constant temperature and humidity chamber (23° C., 60% RH) for about 7 days. Then, about 0.3 g of the pressure sensitive adhesive was poured into a stainless 200 mesh wire net and dipped into 100 ml of ethyl acetate. The resulting product was stored in a dark room at room temperature for 3 days. Then, the insoluble content was separated and dried in an oven at 70° C. for 4 hours. Then, its weight was measured and the gel fraction was measured using it.

2. Evaluation of Adhesion Strength and Re-Movability

The prepared polarizer was cut in a size of 25 mm×100 mm (width×length) to prepare a sample, and then adhered to an alkali-free glass using a laminator after removing the releasing sheet. Then, the resulting product was pressed in autoclave (50° C., 0.5 atmospheres) for about 20 minutes, and stored in the Temperature and Humidity Room Chamber (23° C., 50% RH) for 24 hours. Then, adhesion strength was measured under a condition in a detachment speed of 300 mm/min and a detachment angle of 180 degrees using Texture analyzer (Stable Micro Systems Ltd. (UK)), and evaluated re-movability through this measurement, based on the following basis.

○: after 1 day, adhesion strength being 800 or less
Δ: after 1 day, adhesion strength being 1,000 or more
x: after 1 day, adhesion strength being 2,000 or more 3. Evaluation of Endurance Reliability The prepared polarizer was cut in a size of 180 mm×250 mm (width×length) to prepare a sample, and said sample was attached to a 19 inch panel on market by using laminator. Then, the resulting product was pressed in autoclave (50° C., 0.5 atmospheres) for about 20 minutes, and stored in the Temperature and Humidity Room Chamber (23° C., 50% RH) for 24 hours. Then, to evaluate moisture-heat resistance of the prepared specimens, they were left at a temperature of 60 and a relative humidity of 90% RH for 500 hours and then evaluated formation of bubbles or peeling. Also, in order to know their heat-resistance, they were left at 90 and 105 for 500 hours and then evaluated formation of bubbles or peeling. The evaluation was carried out after specimens were left at room temperature for 24 hours immediately before evaluating their states. The evaluation standard of humidity resistance and heat resistance was as follows.
- ○: No bubble and peeling phenomenon were observed.
- : A few bubbles and/or peeling phenomenon were occurred.
- x: Many bubbles and/or peeling phenomenon were occurred.

4. Light Transmission Uniformity

The evaluation of light transmission uniformity was carried out using the same specimen as that used for evaluating the endurance reliability. As a method of testing light transmission uniformity, a polarizer with attached pressure-sensitive adhesive layer was attached to a 26 inch monitor (manufactured by AU Optronics (TW)), stored under constant temperature and humidity conditions for 1 day, left in an oven at 80° C. for 500 hours, and evaluated about light transmission uniformity of four side conferences in the monitor square. At this time, the evaluation of light transmission uniformity was carried out by calculating an increasing ratio of luminance relative to center part of the monitor after determining luminance value in upper and lower sides of the monitor, and right and left side of the monitor, at regular intervals relative to center part of the monitor by using spectroradiometer CS-2000 (KONICA MINOLTA (JP)). At this time, higher increasing ratio of luminance value is calculated, more light leakage is generated.

5. Modulus of Pressure-Sensitive Adhesive

The pressure-sensitive adhesive was prepared by applying heat to a pressure-sensitive adhesive composition between releasing films (MRF-38, thickness: 38 micron, manufactured by Mitsubishi (JP)) (in case of Comparative Example, UV irradiation). Then pressure-sensitive adhesive layer having a thickness of about 25 µm was prepared by aging the prepared pressure-sensitive adhesive under constant temperature and humidity condition (23° C., 50% RH) for 7 days. Then the releasing film, on which pressure-sensitive adhesive layer was formed, was cut in a size of 6 cm×6 cm, and then the pressure-sensitive adhesive was uniformly rolled to prepare a pressure-sensitive adhesive bar. The pressure-sensitive adhesive bar was securely adhered to upper and lower chucks by rubber gasket in Texture analyzer (Stable Micro Systems Ltd. (UK)), and then gauge length was adjusted to be 2 cm. With applying force at a stretching speed of 120 mm/min, stress according to a length increase was determined Young's modulus of pressure-sensitive adhesive was calculated by determining stress at a point that a length of pressure-sensitive adhesive bar was increased by 100%.

The results measured by the methods as above were arranged and described in Table 2.

TABLE 2

|  | Example | | | | Comparative Example | |
| --- | --- | --- | --- | --- | --- | --- |
|  | 1 | 2 | 3 | 4 | 1 | 2 |
| Gel Content (%) | 94 | 95 | 95 | 94 | 95 | 97 |
| Adhesion Strength (N/25 mm) | 250 | 200 | 270 | 250 | 150 | 130 |
| Re-movability | ○ | ○ | ○ | ○ | ○ | ○ |
| Heat Resistance Durability(90° C.) | ○ | ○ | ○ | ○ | ○ | ○ |
| Heat Resistance Durability(105° C.) | ○ | ○ | ○ | ○ | Δ | Δ |
| Heat Humidity | ○ | ○ | ○ | ○ | Δ | Δ |

TABLE 2-continued

|  | Example | | | | Comparative Example | |
| --- | --- | --- | --- | --- | --- | --- |
|  | 1 | 2 | 3 | 4 | 1 | 2 |
| Resistance Durability |  |  |  |  |  |  |
| Light Transmission Uniformity(%)(up and down) | 3 | 5 | 8 | 5 | 52 | 75 |
| Light Transmission Uniformity(%)(right and left) | 5 | 7 | 9 | 4 | 71 | 94 |
| Modulus(MPa) | 2.3 | 1.8 | 2.1 | 1.5 | 1.5 | 1.8 |

As can be seen from the results of Table 2 above, in case of Examples 1 to 4, in which a thermal initiator is used, they showed an excellent light leakage-preventing property even when being applied to a large monitor with a size of 26 inches, with having superior physical properties concerning endurance reliability, pressure-sensitive adhesive property and re-movability.

However, in case of Comparative Examples 1 and 2, in which a photo initiator is used, a lot of light leakage phenomena were generated at upper and lower side, and right and left side of the monitor. Also, in that case, heat resistance durability and heat humidity resistance durability were very poor.

More concretely, as indicated in FIG. 1, as a result of determining change ratio of luminance (light transmission uniformity) with respect to the horizontal axis of the monitor (X axis, length: 58 cm) after applying the pressure-sensitive adhesive of Example 1 and Comparative Example 1 to 26 inch monitor, there was almost no luminance change obersered in Example 1, however, there was lots of luminance change observed specially at the end points of the monitor.

Also, as a result of monitoring degrees of light leakage phenomena after keeping a polarizer, to which a PSA of Example 1 and Comparative Example 1 is adhered, at 80° C. for 500 hours, there was no light leakage phenomina observed in Example 1, but there was light leakage phenomina observed at the ends point of the monitor in Comparative Example 1.

The invention claimed is:

1. A pressure-sensitive adhesive composition, which includes an interpenetrating polymer network in a cured state, and which comprises an acrylic copolymer having a crosslinkable functional group as a base resin, a multi-functional crosslinking agent, a multi-functional acrylate and a thermal initiator,
   wherein the composition is in the form of a pressure-sensitive adhesive having removability in the cured state,
   wherein an adhesion strength of the pressure-sensitive adhesive with respect to alkali-free glass is 800 gf/25 mm or less,
   wherein the multi-functional acrylate and the thermal initiator form a crosslinking structure by reacting with each other,
   wherein the thermal initiator has a 10 hours half-life temperature of 40° C. to 80° C., wherein the thermal initiator is comprised in an amount of 2.5 to 10 parts by weight, relative to 100 parts by weight of the acrylic copolymer,
   wherein the multi-functional crosslinking agent is one or more compounds selected from the group consisting of an isocyanate compound, an epoxy compound, an aziridine compound and a metal chelate compound, and wherein the multi-functional crosslinking agent forms a crosslinking structure by reacting with the crosslinkable functional group of the acrylic copolymer, and wherein the pressure-sensitive adhesive composition including the interpenetrating polymer network has a gel content of 80% to 99% as represented in General Formula 1:

Gel Content (%)=$B/A$×100  [General Formula 1]

wherein A represents weight of the pressure-sensitive adhesive composition in the cured state, and B represents dry weight of insoluble content after depositing the pressure-sensitive adhesive composition in the cured state in ethyl acetate at room temperature for 48 hours.

2. The pressure-sensitive adhesive composition according to claim 1,
wherein the acrylic copolymer has a weight average molecular weight of 1,000,000 or more.

3. The pressure-sensitive adhesive composition according to claim 1,
wherein, the acrylic copolymer comprises (meth)acrylic acid ester monomer; and a monomer containing the cross-linkable functional group.

4. The pressure-sensitive adhesive composition according to claim 3,
wherein, the (meth)acrylic acid ester monomer is one or more selected from the group consisting of ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate and tetradecyl (meth)acrylate.

5. The pressure-sensitive adhesive composition according to claim 3,
wherein, the monomer containing the cross-linkable functional group is one or more selected from the group consisting of a monomer containing hydroxyl group, a monomer containing a carboxy group and a monomer containing nitrogen.

6. The pressure-sensitive adhesive composition according to claim 1,
wherein, the acrylic copolymer further comprises a monomer containing an alkylene oxide group.

7. The pressure-sensitive adhesive composition according to claim 6,
wherein, the monomer containing an alkylene oxide group is (meth)acrylic acid alkylene oxide adduct.

8. The pressure-sensitive adhesive composition according to claim 1,
wherein, the multi-functional acrylate is one or more selected from the group consisting of trifunctional acrylate, tetrafunctional acrylate, pentafunctional acrylate and hexafunctional acrylate.

9. The pressure-sensitive adhesive composition according to claim 1,
wherein, the multi-functional acrylate comprises cyclic structure in its skeleton.

10. The pressure-sensitive adhesive composition according to claim 1,
wherein, the multi-functional acrylate is comprised in an amount of 5 to 40 parts by weight, relative to 100 parts by weight of the acrylic copolymer.

11. The pressure-sensitive adhesive composition according to claim 1,
wherein, the thermal initiator is one or more selected from the group consisting of azo compound, peroxy ester compound, peroxy dicarbonate compound and acyl peroxide.

12. The pressure-sensitive adhesive composition according to claim 1,
wherein the multi-functional crosslinking agent is comprised in an amount of 0.1 to 3 parts by weight, relative to 100 parts by weight of the acrylic copolymer.

13. The pressure-sensitive adhesive composition according to claim 1, wherein the epoxy compound is ethyleneglycol diglycidylether, triglycidylether, trimethylolpropane triglycidylether, N,N,N',N'-tetraglycidyl ethylenediamine or glycerin diglycidylether.

14. The pressure-sensitive adhesive composition according to claim 1, further comprising a silane coupling agent in an amount of 0.01 to 5 parts by weight, relative to 100 parts by weight of the acrylic copolymer.

15. The pressure-sensitive adhesive composition according to claim 1, further comprising a tackifier resin in an amount of 1 to 100 parts by weight, relative to 100 parts by weight of the acrylic copolymer.

16. The pressure-sensitive adhesive composition according to claim 1,
wherein an adhesion strength of the pressure-sensitive adhesive is 270 gf/25 mm or less, and
wherein the adhesion strength is measured under a condition in a detachment speed of 300 mm/min and a detachment angle of 180 degrees after adhering the pressure sensitive adhesive in a size of 25 mm×100 mm (width×length) to an alkali-free glass using a laminator, pressing the resulted product in an autoclave (50° C., 0.5 atmospheres) for 20 minutes, storing it in a Temperature and Humidity Room Chamber (23° C., 50% Relative Humidity, RH) for 24 hours.

17. A polarizer, comprising:
a polarizing film or a polarizing device; and
a pressure-sensitive adhesive layer which is formed on one or both sides of said polarizing film or device, and comprises a cured product of the pressure-sensitive adhesive composition according to claim 1.

18. A liquid crystal display comprising a liquid crystal panel in which the polarizer according to claim 17 is bonded to one or both sides of a liquid crystal cell.

* * * * *